Patented Mar. 13, 1934

1,950,441

UNITED STATES PATENT OFFICE 1,950,441

PREPARATION OF HALOGEN BUTADIENES AND PROCESS OF PREPARING THE SAME

Wallace H. Carothers, Fairville, Pa., and Donald D. Coffman, Wilmington, Del., assignors to E. I. du Pont de Nemours & Company, Wilmington, Del., a corporation of Delaware No Drawing. Application October 19, 1931
Serial No. 569,832

37 Claims. (Cl. 260—6)

This invention relates to new and useful chemical compounds and to processes of preparing these compounds. More specifically the invention relates to a new method for producing halogen substituted dienes, to new halogen-substituted dienes, to products derived therefrom and methods of making such derivatives.

This invention may be illustrated by the series of steps represented in the following equations:

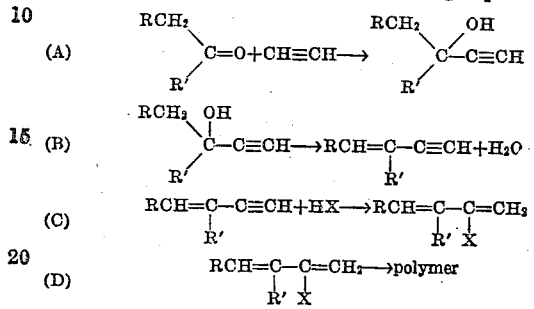

In these equations R and R' represent substituent groups such as substituted or unsubstituted hydrocarbon or heterocyclic radicals or hydrogen, and X represents a halogen atom. The polymers produced by Equation (D) resemble natural rubber in their properties.

Prior art

It has already been proposed to use the reaction represented in Equation (A) as part of a process for the preparation of homologs of butadiene; and the reaction represented in Equation (B) has also been made the subject of patents. (See German Pats. 285,770; 280,226; 286,920; 288,271; and 290,558 assigned to the Fr. Bayer Co.) It has further been disclosed in copending applications of Carothers and Collins, Ser. Nos. 409,538 and 519,243, filed respectively on October 22, 1930 and on February 28, 1931 that a synthetic rubber of excellent quality is readily obtained by the polymerization of the β substituted 1,3-butadienes defined by the formula $$CH_2=C(X)-CH=CH_2$$

in which X stands for a halogen atom; and that such compounds, to which the general name "haloprenes" has been assigned, are readily obtained by the combination of monovinyl acetylene with hydrohalogen acids.

Objects of invention

One object of the present invention pertains to a new method for preparing halogen-substituted butadienes. Another object relates to novel halogen-substituted butadienes per se. A still further object relates to synthetic rubber produced from the novel halogen-substituted butadienes, and its mode of preparation. Other objects of the invention will be evident from the detailed description of the invention.

Description of invention

The process of the present invention has the advantage that it leads to the production not only of the simple haloprenes such as chloro-2-butadiene-1,3 and bromo-2-butadiene-1,3, but it leads also to the production of substituted haloprenes of the general formula

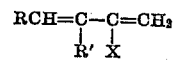

in which R and/or R' are substituent groups as aliphatic, aromatic and heterocyclic groups. By changing the nature of these groups it is possible to change the properties of the polymer. The process of the present invention therefore makes accessible a whole series of haloprenes and a whole series of synthetic rubbers not hitherto known.

The method of carrying out the process of the present invention will be clear from the following description. The first step consists in the preparation of the ethinyl carbinol. In this step the starting materials are, on the one hand, acetylene, and, on the other hand, an aldehyde or a ketone. The aldehyde or ketone must have at least two carbon atoms and there must be a hydrogen atom on the carbon adjacent to the carbonyl group. Highly unsaturated aldehydes and ketones are in general to be avoided since they give rise to products that tend to resinify before the haloprene stage is reached. The condensation between the aldehyde or ketone and the acetylene is conveniently brought about through the activity of a metallic derivative of the acetylene. Thus the acetylene, by the action of sodium or of sodamide, may be converted into sodium acetylide. The sodium acetylide when reacted with the aldehyde or the ketone yields an addition product which is readily decomposed by the addition of water with the formation of the acetylenic carbinol. In bringing about this combination it is, however, in general not necessary to isolate the sodium acetylide as such, but the ketone or aldehyde may, for example, be mixed with sodamide, and then treated with acetylene, whereupon reaction occurs with the formation of an addition product which, subsequently, by the action of water is converted into the acetylenic carbinol. Aldehydes and ketones other than those specifically mentioned in the examples may be used such as cyclopentanone, dipropyl ketone, acetophenone, propionaldehyde, butyraldehyde, and phenylacetaldehyde.

The second step of the process of the present invention involves the dehydration of the carbinol to form the vinyl acetylene. This can be brought about by heating the liquid acetylenic carbinol with a dehydrating agent or catalyst. Such agents are sulfuric acid, phosphoric acid, sulfonic acids, iodine, and magnesium sulfate. In general, however, it is preferable to carry out the dehydration at elevated temperatures in the presence of solid dehydrating catalysts such as basic aluminum sulfate, alminum oxide, tungsten oxide, thorium oxide, and silica gel. Temperatures above 200° C. and below 500° C. are suitable.

The addition of the hydrohalogen acid to the vinyl acetylene is brought about by the methods already described by Carothers and Collins U. S. application Serial No. 409,538, filed October 22, 1930. In general, the substituted vinyl acetylenes add hydrohalogen acid less readily than does vinyl acetylene itself, and for this reason it is generally preferable to employ higher temperatures when dealing with the substituted compounds. Temperatures up to 100° C. may be employed for this phase of the invention.

The haloprenes obtained by the process of the present invention belong to a family which may be represented by the general formula

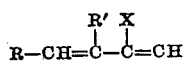

in which R and R' are substituent groups such as aliphatic, aromatic, heterocyclic radicals or hydrogen. The conditions for the polymerization of the simple haloprenes (R and R'=H) and the nature of the polymers obtained have already been described in the application of Carothers and Collins referred to above, and in application to Williams, Serial No. 519,244, filed February 28, 1931, to Carothers, Collins and Kirby, Serial No. 519,241, and 519,242, filed February 28, 1931, and to Collins, Serial No. 537,484, filed May 14, 1931. We have now found that the polymerization of the substituted haloprenes proceeds in a similar manner and likewise leads to rubber-like products. The chief difference lies in the fact that the substituted haloprenes generally polymerize more slowly. The polymers are also in general somewhat softer. The polymerization of the substituted haloprenes can be carried out under any of the conditions already described in the applications already referred to for the polymerization of the unsubstituted compounds, e. g., in the presence or absence of solvents for the starting material, for the polymer or for both, or in the presence of polymerization catalysts; in emulsion form; in the presence or absence of air, light, elevated temperature, and elevated pressure. A preferred method of bringing about the polymerization involves the use of light in the presence of a limited amount of air. By interrupting the polymerization of the substituted haloprenes when the product is in the form of a viscous liquid or a soft jelly and separating the polymer from the unchanged haloprene, it is possible to obtain plastic rubber-like polymers capable of being further polymerized to non-plastic, elastic, rubber-like polymers. These plastic polymers can, therefore, be mixed and compounded with fillers, dyes, pigments, accelerators, and other modifying ingredients, protective agents, etc., and they can then be molded into any desired shape. The shaped article can then be cured to a product resembling a vulcanized natural rubber. Polymerization of the substituted haloprenes can also be carried out in aqueous emulsion to yield a synthetic latex.

The following examples illustrate various adaptations of the invention:

EXAMPLE I

*Preparation of a polymer of chloro-2-buta diene-1,3*

Acetaldehyde (2 mols) is diluted with ten times its volume of ether. While the mixture is agitated and cooled to −10° C. it is first slowly treated with 2 mols of finely powdered sodamide and then acetylene is introduced under an excess pressure of one atmosphere. After 8 hours the ethereal solution is treated with cold water and dilute sulfuric acid, separated, dried, and carefully distilled. The ethinyl methyl carbinol is thus obtained as a colorless liquid boiling at 107°–112° C.

The ethinyl methyl carbinol is dehydrated by passing it over basic aluminum sulfate at 240°–260° C. It is advantageous to have an inert diluent gas such as nitrogen present in the reaction chamber. The receiving vessel is cooled with a mixture of solid carbon dioxide and acetone. The crude product is best freed from unchanged carbinol by distillation. The purified product obtained in this way consists of monovinyl acetylene boiling at 6° to 10° C.

The vinyl acetylene obtained in this way is readily converted into chloro-2-butadiene-1,3 by the following procedure: 50 parts by weight of cold monovinyl acetylene is placed in a pressure bottle containing a thoroughly chilled mixture composed of 150 parts of concentrated hydrochloric acid (sp. gr. 1.19), 25 parts of cuprous chloride, and 10 parts of ammonium chloride. The bottle is closed and placed in a water bath the temperature of which is held at approximately 30° C. where it is vigorously shaken for a period of 4 hours. The contents of the bottle are then submitted to steam distillation in vacuo (100–250 mm.). The distillate is mixed with a small amount of catechol or pyrogallol and redistilled through an efficient column provided with a refrigerated dephlegmator and receiver. Pure chloro-2-butadiene-1,3 is thus obtained in yields of 75–92% of the theory based on the vinyl acetylene used. Under ordinary pressure it boils at about 60° C.

The chloro-2-butadiene-1,3 is converted into a rubber-like polymer by the following process: 200 g. of the chloro-2-butadiene-1,3 is placed in a 300 cc. stoppered bottle of soda glass directly illuminated by a 150 watt Mazda lamp. The temperature is about 30–35° C. After 36 hours the contents of the bottle have changed to an exceedingly viscous, fluid mass. This mass is placed in an evacuated container provided with a mechanical mixer, a condenser and thoroughly cooled receiver. One gram of phenyl-β-naphthylamine is added, the container is stirred and evacuated and the unchanged chloro-2-butadiene-1,3 is allowed to distill into the receiver. The residual polymer consists of a soft, plastic mass resembling unvulcanized natural rubber. It weighs about 75 g.

One hundred parts by weight of this mass are mixed on the rolls of the rubber mill with 20 parts of zinc oxide and 1 part of stearic acid;

and the resulting compound is pressed into a mold and heated to 140° C. for 20 minutes. The product is a finished article composed of cured synthetic rubber. It is non-plastic, elastic, and very strong.

EXAMPLE II

*Preparation of a polymer of chloro-2-methyl-3-butadiene-1,3*

Acetone (2 mols) is mixed with one liter of dry ether. The mixture is vigorously agitated and cooled to −10° C. while 2 mols of finely powdered sodamide are slowly added. After 5 hours the evolution of ammonia practically ceases. With continued agitation and cooling gaseous acetylene is then passed into the mixture preferably under a pressure of about one atmosphere. After 8 days the reaction mixture is poured onto crushed ice, and acidified with dilute sulfuric acid. The ethereal layer is separated. The aqueous layer is extracted with ether. The combined ethereal solutions are then dried and distilled. The dimethyl ethinyl carbinol is thus obtained as a colorless liquid boiling at 104°–108° C.

The dimethyl ethinyl carbinol is dehydrated by mixing it with an equal weight of p-toluene sulfonic acid and heating the mixture to 90° C. in a distilling flask. The distillate on being redistilled gives a good yield of α-methyl vinyl acetylene (methyl-2-buten-1-ine-3). It is a colorless liquid which boils at 34° C.

This is converted into the corresponding chloroprene, chloro-2-methyl-3-butadiene-1,3 as follows: 40 parts by weight of the α-methyl vinyl acetylene are placed in a pressure bottle together with 126 parts of concentrated hydrochloric acid (sp. gr. 1.19), 15 parts of cuprous chloride and 6 parts of ammonium chloride. The bottle is shaken for 4.5 hours at 20° C. The reaction mixture is then steam distilled. The oily layer is separated from the distillate and redistilled. The new compound chloro-2-methyl-3-butadiene-1,3 is thus obtained in good yield as a colorless liquid boiling at about 93° C. at ordinary pressure. Its density at 20° C. is 0.959. It is best preserved in the presence of a polymerization inhibitor such as catechol or pyrogallol. In the process of purification it is best to distill under diminished pressure and to have an inhibitor present. It boils at 41° C. at 113 mm.

When a sample of pure chloro-2-methyl-3-butadiene-1,3 is allowed to stand at the ordinary temperature in the presence of a little air, it gradually becomes more viscous and its density increases. After 4 to 5 days it has set to a soft jelly which still contains a considerable amount of unchanged monomer. After about 10 days all the monomer has polymerized. The product is a resilient, elastic, strong, tough mass resembling in its physical properties a mass of soft, vulcanized natural rubber.

A plastic polymerizable polymer of chloro-2-methyl-3-butadiene-1,3 is obtained by interrupting the polymerization before it is complete, and separating the polymer from the unchanged monomer. Thus chloro-2-methyl-3-butadiene-1,3 is allowed to stand as before for 4 days, and the soft jelly-like mass is macerated with alcohol to remove unchanged monomer. The polymer thus obtained is soluble in benzene, and it is soft and plastic. One hundred parts of such a polymer are compounded with 1 part of phenyl-β-naphthylamine, 5 parts of zinc oxide, and 2 parts of stearic acid. This compound is pressed into a mold and heated at 140°–145° C. for 15 minutes. The resulting finished article is strong, highly elastic, and non-plastic.

EXAMPLE III

*Preparation of a polymer of chloro-2-dimethyl-3,4-butadiene-1,3*

Methyl ethyl ketone is treated with sodamide and condensed with acetylene by the method illustrated for acetone in Example II. The methyl ethyl ethinyl carbinol is obtained in good yields in the form of a colorless liquid boiling at 119°–123° C.

This is dehydrated as follows: 60 parts of the carbinol are dropped slowly onto 10 parts of p-toluene sulfonic acid contained in a distilling flask heated to 80° C. After the addition during 30 minutes of all of the carbinol, the pressure in the distilling flask is diminished and the hydrocarbon α,β-dimethyl vinyl acetylene (dimethyl-1,2-buten-1-ine-3) is allowed to distill out into the receiver. It is purified by redistillation and is thus obtained as a colorless liquid boiling at 68°–71° C.

This is converted into the corresponding chloroprene, chloro-2-dimethyl-3,4-butadiene-1,3 as follows: 25 parts by weight of the α,β-dimethyl vinyl acetylene are placed in a bottle together with 60 parts of concentrated hydrochloric acid (sp. gr. 1.19); 8.5 parts of cuprous chloride, and 3.5 parts of ammonium chloride. The bottle is shaken at 30° C. for 10 hours. The reaction mixture is steam distilled. The oily distillate is separated, treated with a small amount of hydroquinone, and redistilled. The new compound chloro-2-dimethyl-3,4-butadiene-1,3 is thus obtained as a colorless liquid boiling at 57°–60° C. at 96 mm. It has a density at 20° C. of 0.944.

On standing this substance polymerizes to a rubber-like material. The rate of polymerization is considerably slower than for the haloprenes described in the preceding examples. At the ordinary temperature in the presence of a little air only about 10% of the chloroprene has polymerized in 30 days. The polymerization may, however, be considerably accelerated by the use of elevated pressure, or elevated temperature, by exposure to light, by the presence of peroxides, and especially by emulsifying the chloroprene before subjecting it to polymerizing conditions.

EXAMPLE IV

*Preparation of a polymer of chloro-2-tetramethylene-3,4-butadiene-1,3*

Cyclohexanone is treated with sodamide and condensed with acetylene by the method illustrated for acetone in Example II. The ethinyl cyclohexanol is thus obtained in good yields as a colorless liquid boiling at 174° C. at 260 mm.

This is dehydrated by passing it over a basic aluminum sulfate catalyst at 240°–260° C. The ethinyl-1-cyclohexene-1 obtained in this way is a colorless liquid boiling at 40°–43° C. at 12 mm. It is converted into chloro-2-tetramethylene-3,4-butadiene-1,3 as follows: 33 parts by weight of ethinyl-1-cyclohexene-1 are placed in a bottle together with 83 parts of concentrated hydrochloric acid (sp. gr. 1.19), 10 parts of cuprous chloride, and 4 parts of ammonium chloride. The bottle is shaken at 20° C. for 5 hours. The reaction mixture is then steam distilled in vacuum, and the oily distillate is separated and redistilled. The new compound, chloro-2-tetramethylene-3,4-butadiene-1,3 is obtained in a good yield as a colorless liquid boiling at 55°–57° C. at 1 mm. It has a density at 20° C. of 1.042.

On standing this compound polymerizes. The final product is a rubber-like mass, but the rate of polymerization is considerably slower than with the haloprenes illustrated in the preceding examples. For this reason it is preferred to carry out the polymerization at elevated pressure or temperature or in the presence of catalysts. The polymerization also proceeds more rapidly when the haloprene is emulsified. A sample of chloro-2-tetramethylene-3,4-butadiene-1,3 at 35° C. is subjected to a pressure of 8000 atmospheres for a period of 36 hours. It is thus transformed into a tough, extensible, elastic, resilient material resembling soft, cured, natural rubber.

EXAMPLE V

*Preparation of a polymer of bromo-2-butadiene-1,3*

Acetaldehyde is condensed with acetylene as in Example I and the resulting carbinol is dehydrated in the manner there described. The vinyl acetylene thus prepared is converted into bromo-2-butadiene-1,3 by the following method: 50 grams of vinyl acetylene are placed in a pressure bottle together with 185 cc. of concentrated hydrobromic acid (approximately 11 normal), and 35 grams of cuprous bromide. The bottle is vigorously shaken for 6 hours at room temperature and the oily layer is then separated, mixed with a little hydroquinone, dried, and distilled. The bromo-2-butadiene-1,3 is thus obtained as a pale yellow liquid boiling at 38°–40° C. at 155-165 mm. It has a specific gravity of 1.402.

On standing it gradually becomes more viscous and finally after 10 days at the ordinary conditions it is converted into a dense, elastic, tough mass. The polymerization of the bromoprene can also be brought about as follows: One volume of bromoprene is emulsified by stirring it with one volume of a 2% aqueous solution of sodium oleate containing 1% of its weight of catechol. After 3 days at the ordinary temperature the emulsion is completely polymerized. When the resulting fluid latex is spread out into a thin film on a plate of porous porcelain, the water evaporates and there remains an opaque, cream-colored, tough, flexible, elastic sheet or film.

In the process of the present invention, it is not absolutely requisite that the step (B) should precede the step (C). That is, a process in which the acetylenic carbinol is treated with a hydrohalogen acid and the resulting addition product dehydrated will also lead to a substituted haloprene, and it is intended to include this variation within the scope of the present invention.

It will be understood that the examples and description are illustrative only. The procedure followed in the examples may be utilized generally for the preparation of halogen-2-butadienes which may further contain in the 3- and/or 4- position a substituent group other than hydrogen. The method described in the examples makes possible the production of numerous new halogen-2-butadienes, these compounds, as well as their mode of preparation, and their conversion into polymers, being included within the broad concept of the invention.

These haloprenes may also be polymerized in the presence of other polymerizable materials such as styrene, vinyl acetate, drying or semi-drying oils, divinylacetylene and its polymers, natural and synthetic resins, such as polyhydric alcohol-polybasic acid resins, furfural resins, etc.

It will further be understood that any variations or departures from the description of invention outlined herein, which conform to the spirit of the invention, are intended to be embraced within the scope of the claims.

We claim:

1. Chemical compounds corresponding to the formula

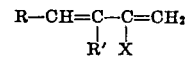

in which X is a halogen atom and R and R' are substituent groups taken from the class consisting of hydrocarbon radicals and hydrogen, at least one of which groups is different from hydrogen.

2. Chemical compounds corresponding to the formula

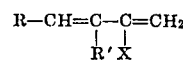

in which X is a halogen atom and R and R' are substituent groups taken from the class consisting of hydrocarbon radicals and hydrogen, at least one of which groups is different from hydrogen and in which R and R' are directly joined.

3. Chemical compounds corresponding to the formula

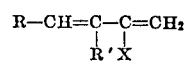

in which X is a halogen atom, R is an hydrocarbon radical or hydrogen, and R' is an hydrocarbon radical.

4. The compounds described in claim 3 in which R is a hydrocarbon radical.

5. The compounds described in claim 3 in which X is a chlorine atom.

6. The compounds described in claim 3 in which R is a hydrogen atom.

7. The compounds described in claim 3 in which R is a hydrogen atom, and X is a chlorine atom.

8. The compounds described in claim 1 in which X is a chlorine atom.

9. Chloro-2-methyl-3-butadiene-1,3.

10. The process of forming halogen-2-butadienes which comprises producing a carbinol of the general formula

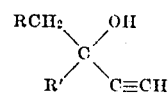

in which R and R' are hydrocarbon radicals or hydrogen, dehydrating said carbinol to produce a vinylacetylene and reacting the vinylacetylene with a hydrogen halide.

11. The process described in claim 10 in which the hydrogen halide is hydrogen chloride.

12. A process of forming halogen-2-butadienes which comprises reacting hydrogen halide with a substituted vinylacetylene corresponding to the following formula:

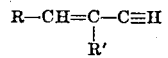

in which R and R' are substituent groups taken from the class consisting of hydrocarbon radicals and hydrogen, at least one of which groups is different from hydrogen.

13. A process of forming chloro-2-butadienes which comprises reacting hydrogen chloride with a substituted vinylacetylene corresponding to the following formula:

$$R-CH=C-C\equiv H$$
$$\phantom{R-CH=C-}|$$
$$\phantom{R-CH=C-}R'$$

in which R and R' are substituent groups taken from the class consisting of hydrocarbon radicals and hydrogen, at least one of which groups is different from hydrogen.

14. A process of forming chloro-2-butadienes which comprises reacting hydrogen chloride with a substituted vinylacetylene corresponding to the following formula:

$$R-CH=C-C\equiv H$$
$$\phantom{R-CH=C-}|$$
$$\phantom{R-CH=C-}R'$$

in which R and R' are substituent groups taken from the class consisting of hydrocarbon radicals and hydrogen, at least one of which groups is different from hydrogen, the reaction being carried on in the presence of a catalyst comprising cuprous chloride.

15. A process of forming chloro-2-butadienes which comprises reacting hydrogen chloride with a substituted vinylacetylene corresponding to the following formula:

$$R-CH=C-C\equiv H$$
$$\phantom{R-CH=C-}|$$
$$\phantom{R-CH=C-}R'$$

in which R and R' are substituent groups taken from the class consisting of hydrocarbon radicals and hydrogen, at least one of which groups is different from hydrogen, the reaction being carried on in the presence of a catalyst comprising cuprous chloride and ammonium chloride.

16. The process of claim 12 in which the hydrogen halide is hydrogen bromide.

17. A polymer of a compound corresponding to the following formula:

$$R-CH=C-C=CH_2$$
$$\phantom{R-CH=}|\phantom{-}|$$
$$\phantom{R-CH=}R'\phantom{-}X$$

in which X is a halogen atom and R and R' are substituent groups taken from the class consisting of hydrocarbon radicals and hydrogen, at least one of which groups is different from hydrogen.

18. The product described in claim 17 in which R' is different from hydrogen.

19. The product described in claim 17 in which R' is different from hydrogen, and in which X is a chlorine atom.

20. A polymer of chloro-2-methyl-3-butadiene-1,3.

21. A plastic polymer of a compound corresponding to the following formula $$R-CH=C-C=CH_2$$
$$\phantom{R-CH=}|\phantom{-}|$$
$$\phantom{R-CH=}R'\phantom{-}X$$

in which X is a halogen atom, and in which R and R' are substituent groups taken from the class consisting of hydrocarbon radicals and hydrogen, at least one of which groups is different from hydrogen.

22. A polymer of a compound corresponding to the following formula $$R-CH=C-C=CH_2$$
$$\phantom{R-CH=}|\phantom{-}|$$
$$\phantom{R-CH=}R'\phantom{-}X$$

in which X is a chlorine atom and R and R' are substituent groups taken from the class consisting of hydrocargon radicals and hydrogen, at least one of which groups is different from hydrogen.

23. A plastic polymer of a compound corresponding to the following formula $$R-CH=C-C=CH_2$$
$$\phantom{R-CH=}|\phantom{-}|$$
$$\phantom{R-CH=}R'\phantom{-}X$$

in which X is a chlorine atom and R and R' are substituent groups taken from the class consisting of hydrocarbon radicals and hydrogen, at least one of which groups is different from hydrogen.

24. An elastic, non-plastic polymer of a compound corresponding to the following formula:

$$R-CH=C-C=CH_2$$
$$\phantom{R-CH=}|\phantom{-}|$$
$$\phantom{R-CH=}R'\phantom{-}X$$

in which X is a halogen atom and R and R' are substituent groups taken from the class consisting of hydrocarbon radicals and hydrogen, at least one of which groups is different from hydrogen.

25. A process for making synthetic rubber which comprises polymerizing a compound corresponding to the following formula:

$$R-CH=C-C=CH_2$$
$$\phantom{R-CH=}|\phantom{-}|$$
$$\phantom{R-CH=}R'\phantom{-}X$$

in which X is a halogen atom and R and R' are substituent groups taken from the class consisting of hydrocarbon radicals and hydrogen, at least one of which groups is different from hydrogen.

26. A process for making synthetic rubber which comprises polymerizing a compound corresponding to the following formula:

$$R-CH=C-C=CH_2$$
$$\phantom{R-CH=}|\phantom{-}|$$
$$\phantom{R-CH=}R'\phantom{-}Cl$$

in which R and R' are substituent groups taken from the class consisting of hydrocarbon radicals and hydrogen, at least one of which groups is different from hydrogen.

27. A process for making synthetic rubber which comprises polymerizing a compound corresponding to the following formula:

$$R-CH=C-C=CH_2$$
$$\phantom{R-CH=}|\phantom{-}|$$
$$\phantom{R-CH=}R'\phantom{-}X$$

in which X is a halogen atom, R is a hydrocarbon radical or hydrogen, and R' is a hydrocarbon radical.

28. The process described in claim 24 in which the X radical of the compound undergoing polymerization is a chlorine atom.

29. A process for making synthetic rubber which comprises polymerizing a compound corresponding to the following formula $$R-CH=C-C=CH_2$$
$$\phantom{R-CH=}|\phantom{-}|$$
$$\phantom{R-CH=}R'\phantom{-}X$$

in which X is a halogen atom and R and R' are substituent groups taken from the class consisting of hydrocarbon radicals and hydrogen, at least one of which groups is different from hydrogen, discontinuing the polymerization while a substantial portion of the compound remains unpolymerized, and separating the polymer from the unpolymerized compound.

30. A process for making synthetic rubber which comprises polymerizing a compound corresponding to the following formula $$R-CH=C-C=CH_2$$
$$\phantom{R-CH=}|\phantom{-}|$$
$$\phantom{R-CH=}R'\phantom{-}X$$

in which X is a halogen atom and R and R' are substituent groups taken from the class consisting of hydrocarbon radicals and hydrogen, at least one of which groups is different from hydrogen, discontinuing the polymerization while a substantial portion of the compound remains unpolymerized, then recovering the plastic polymer and subjecting the plastic polymer to further polymerization until the polymerization is substantially completed whereby to obtain a nonplastic, elastic, rubber-like mass.

31. The process described in claim 10 in which the hydrogen halide is hydrogen chloride and in which R and R' are hydrogen.

32. The compounds described in claim 1 in which the hydrocarbon radicals represented by R and R' are saturated.

33. The compounds described in claim 1 in which the hydrocarbon radicals represented by R and R' are alkyl radicals.

34. The process of claim 14 in which the hydrocarbon radicals represented by R and R' are saturated radicals.

35. The process of claim 14 in which the hydrocarbon radicals represented by R and R' are alkyl radicals.

36. The compounds described in claim 17 in which the hydrocarbon radicals represented by R and R' are saturated.

37. The compounds described in claim 17 in which the hydrocarbon radicals represented by R and R' are alkyl radicals.

WALLACE H. CAROTHERS.
DONALD D. COFFMAN.